United States Patent
Kumar et al.

(10) Patent No.: US 10,665,892 B2
(45) Date of Patent: May 26, 2020

(54) LITHIUM BATTERIES WITH NANO-COMPOSITE POSITIVE ELECTRODE MATERIAL

(75) Inventors: Sujeet Kumar, Newark, CA (US); Santhanam Raman, Foster City, CA (US); Shoufen Yang, Daly City, CA (US); Deepak Srivastava, San Jose, CA (US)

(73) Assignee: EoCell Limited, Hong Kong (CN)

( * ) Notice: Subject to any disclaimer, the term of this patent is extended or adjusted under 35 U.S.C. 154(b) by 1204 days.

(21) Appl. No.: 12/522,434

(22) PCT Filed: Jan. 11, 2008
(Under 37 CFR 1.47)

(86) PCT No.: PCT/US2008/000445
§ 371 (c)(1),
(2), (4) Date: Feb. 12, 2010

(87) PCT Pub. No.: WO2008/086041
PCT Pub. Date: Jul. 17, 2008

(65) Prior Publication Data
US 2010/0248033 A1    Sep. 30, 2010

Related U.S. Application Data

(60) Provisional application No. 60/879,970, filed on Jan. 10, 2007.

(51) Int. Cl.
*H01M 10/0525*    (2010.01)
*H01M 4/505*    (2010.01)
(Continued)

(52) U.S. Cl.
CPC ......... *H01M 10/0525* (2013.01); *B82Y 30/00* (2013.01); *C01G 45/1228* (2013.01);
(Continued)

(58) Field of Classification Search
CPC .. H01M 10/0525; H01M 4/366; H01M 4/485; H01M 4/505; H01M 4/525;
(Continued)

(56) References Cited

U.S. PATENT DOCUMENTS 6,558,836 B1 * 5/2003 Whitacre et al. ............. 429/162
6,680,143 B2 * 1/2004 Thackeray et al. ........... 429/224
(Continued)

OTHER PUBLICATIONS

Sun et al (Significant improvement of high voltage cycling behavior AIF3-coated LiCoO2 cathode, Electrochem Comm 8 (2006), pp. 821-826). (Year: 2006).*
(Continued)

*Primary Examiner* — Melvin C. Mayes
*Assistant Examiner* — Michael Forrest
(74) *Attorney, Agent, or Firm* — Horizon IP Pte Ltd

(57) ABSTRACT

Provided is a positive electrode for a lithium ion battery, the electrode comprising a nano-crystalline layered-layered composite structure of a material having the general formula $xLi_2MO_3(1-x)LiM'O_2$ in which $0<x<1$, where M' is one or more ion with an average oxidation state of three and with at least one ion being Mn or Ni, and where M is one or more ions with an average oxidation state of four. Another aspect provides a positive electrode for a lithium ion battery, the electrode comprising a nano-crystalline layered-spinel composite structure of a material having the general formula $xLi_2MnO_3 \cdot (1-x)LiMn_{2-y}M_yO_4$ in which $0.5<x<1.0$, $0 \leq y<1$, and where M is one or more metal cations. Also provided is the positive electrode which comprises a nano-coating of inert oxide, inert phosphate or inert fluoride on the nano-crystalline composite structure. Additional aspects provide a lithium ion battery comprising a negative electrode, an electrolyte and the positive electrode, as well as methods of preparing the positive electrode composite structure and the nano-coating of inert oxide, inert phosphate or inert fluoride.

13 Claims, 2 Drawing Sheets

Co-precipitation method

Sol-gel method

(51) Int. Cl.
*H01M 4/485* (2010.01)
*H01M 4/36* (2006.01)
*B82Y 30/00* (2011.01)
*H01M 4/525* (2010.01)
*H01M 4/62* (2006.01)
*C01G 51/00* (2006.01)
*C01G 45/12* (2006.01)
*C01G 53/00* (2006.01)
*H01M 4/02* (2006.01)

(52) U.S. Cl.
CPC ......... *C01G 45/1257* (2013.01); *C01G 51/50* (2013.01); *C01G 53/50* (2013.01); *H01M 4/366* (2013.01); *H01M 4/485* (2013.01); *H01M 4/505* (2013.01); *H01M 4/525* (2013.01); *H01M 4/62* (2013.01); *C01P 2002/20* (2013.01); *C01P 2002/32* (2013.01); *C01P 2004/03* (2013.01); *C01P 2004/62* (2013.01); *C01P 2004/64* (2013.01); *C01P 2004/80* (2013.01); *C01P 2006/40* (2013.01); *H01M 2004/021* (2013.01); *Y02T 10/7011* (2013.01)

(58) Field of Classification Search
CPC ..... H01M 4/62; B82Y 30/00; C01G 45/1228; C01G 45/1257; C01G 51/50; C01G 53/50
See application file for complete search history.

(56) References Cited

U.S. PATENT DOCUMENTS

| | | | |
|---|---|---|---|
| 6,749,648 B1* | 6/2004 | Kumar et al. | 29/623.1 |
| 6,960,335 B1* | 11/2005 | Singhal et al. | 423/599 |
| 2004/0191633 A1* | 9/2004 | Johnson et al. | 429/246 |
| 2006/0051671 A1* | 3/2006 | Thackeray | C01G 45/1221 429/224 |
| 2006/0051673 A1* | 3/2006 | Johnson et al. | 429/224 |
| 2006/0134527 A1* | 6/2006 | Amine et al. | 429/326 |

OTHER PUBLICATIONS

Wang et al (Citric Acid-Assisted Sol-Gel Synthesis of nanocrystalline LiMn2O4 spinel as cathode material, J. Crys Growth 256 (2003) 123-127). (Year: 2003).*

* cited by examiner

Sol-gel method

Co-precipitation method

LITHIUM BATTERIES WITH NANO-COMPOSITE POSITIVE ELECTRODE MATERIAL

CROSS-REFERENCE TO RELATED APPLICATIONS

This application is a 371 US national application of PCT International Application Ser. No. PCT/US2008/000445, filed on Jan. 11, 2008, which claims the benefit of U.S. Provisional Application No. 60/879,970 filed on Jan. 10, 2007. The disclosure of all of which are herein incorporated by reference in their entireties for all purposes.

FIELD OF THE INVENTION

The present invention relates to lithium batteries with a nano-composite positive electrode material.

DESCRIPTION OF THE RELATED ART

Lithium ion batteries are used for applications such as power tools, electric bikes, electric vehicles and hybrid electric vehicles. Lithium ion batteries which provide a good high rate discharge system are needed for these applications. In available commercial lithium ion batteries, energy density decreases as power density increases.

U.S. Pat. Nos. 6,677,082 and 6,680,143 describe a positive electrode material derived from 'composite' structures in which a layered $Li_2MnO_3$ component is structurally integrated with a layered $LiMO_2$ component. These electrodes can be represented in two-component notation as $xLi_2MO_3 \cdot (1-x)LiM'O_2$ where M' is one or more trivalent ion with at least one ion being Mn or Ni and where M is a tetravalent ion.

U.S. Patent Application Publications Nos. 2006/0051671 and 2006/0051673 describe a positive electrode material derived from 'composite' structures in which a layered $Li_2MnO_3$ component is structurally integrated with a spinel $LiMn_{2-y}M_yO_4$ component. These electrodes can be represented in two-component notation as $xLi_2MnO_3 \cdot (1-x)LiMn_{2-y}M_yO_4$ where M is one or more metal cations.

A description of the $xLi_2MO_3 \cdot (1-x)LiM'O_2$ material and the $xLi_2MnO_3 \cdot (1-x)LiMn_{2-y}M_yO_4$ material can also be found, for example, in Thackeray et al. (J. Mater. Chem., 15:2257-2267, 2005).

Available lithium ion batteries do not achieve a good, high rate discharge system. Therefore, a need exists in the industry to address the deficiencies and inadequacies of available lithium ion batteries.

The present work further improves the morphology of the composite positive electrode material. In one aspect, a positive electrode material having a nano-crystalline composite structure is synthesized. In a second aspect, a thin layer of inert oxide is applied on composite positive electrode particles.

SUMMARY OF THE INVENTION

In one aspect, the present invention provides a positive electrode for a lithium ion battery. The electrode comprises a nano-crystalline layered-layered composite structure of a material having the general formula $xLi_2MO_3(1-x)LiM'O_2$ in which $0<x<1$, where M' is one or more ion with an average oxidation state of three and with at least one ion being Mn or Ni, and where M is one or more ions with an average oxidation state of four. In another aspect, the positive electrode layered-layered composite material comprises a nano-coating of inert oxide, inert phosphate or inert fluoride.

In another aspect, the present invention provides a lithium ion battery comprising a negative electrode, an electrolyte and a positive electrode, the positive electrode comprising a nano-crystalline layered-layered composite structure of a material having the general formula $xLi_2MO_3(1-x)LiM'O_2$ in which $0<x<1$, where M' is one or more ion with an average oxidation state of three and with at least one ion being Mn or Ni, and where M is one or more ions with an average oxidation state of four. An additional aspect provides a lithium battery wherein the nano-crystalline layered-layered composite structure further comprises a nano-coating of inert oxide, inert phosphate or inert fluoride.

Another aspect of the present invention provides a positive electrode for a lithium ion battery, wherein the electrode comprises a nano-crystalline layered-spinel composite structure of a material having the general formula $xLi_2MnO_3 \cdot (1-x)LiMn_{2-y}M_yO_4$ in which $0.5<x<1.0$, $0 \leq y<1$, and where M is one or more metal cations with an average oxidation state ranging from one to four. In another aspect, the positive electrode layered-spinel composite material comprises a nano-coating of inert oxide, inert phosphate or inert fluoride.

In still another aspect, the present invention provides a lithium ion battery comprising a negative electrode, an electrolyte and a positive electrode, the positive electrode comprising a nano-crystalline layered-spinel composite structure of a material having the general formula $xLi_2MnO_3 \cdot (1-x)LiMn_{2-y}M_yO_4$ in which $0.5<x<1.0$, $0 \leq y<1$, and where M is one or more metal cations with an average oxidation state ranging from one to four. An additional aspect provides a lithium battery wherein the nano-crystalline layered-spinel composite structure further comprises a nano-coating of inert oxide, inert phosphate or inert fluoride.

Yet another aspect of the present invention provides a method for making a nano-crystalline composite structure of a material for a positive electrode in a lithium battery, the method comprising co-precipitation or sol-gel synthesis. Still another aspect of the present invention provides a method for applying a nano-coating of an inert oxide, inert phosphate or inert fluoride onto a nano-crystalline composite structure of a material for a positive electrode in a lithium battery, the method comprising ammonium hydroxide precipitation of a hydrated inert oxide, inert phosphate or inert fluoride from an aqueous solution onto the nano-crystalline composite structure, followed by calcination so as to form a nano layer of inert oxide, inert phosphate or inert fluoride on the nano-crystalline composite structure.

Other systems, methods, features and advantages of the present invention will be or become apparent to one with skill in the art upon examination of the following drawings and detailed description. It is intended that all such additional systems, methods, features and advantages be included within this description, be within the scope of the present invention, and be protected by the accompanying claims.

DESCRIPTION OF PREFERRED EMBODIMENTS

Figure 1:
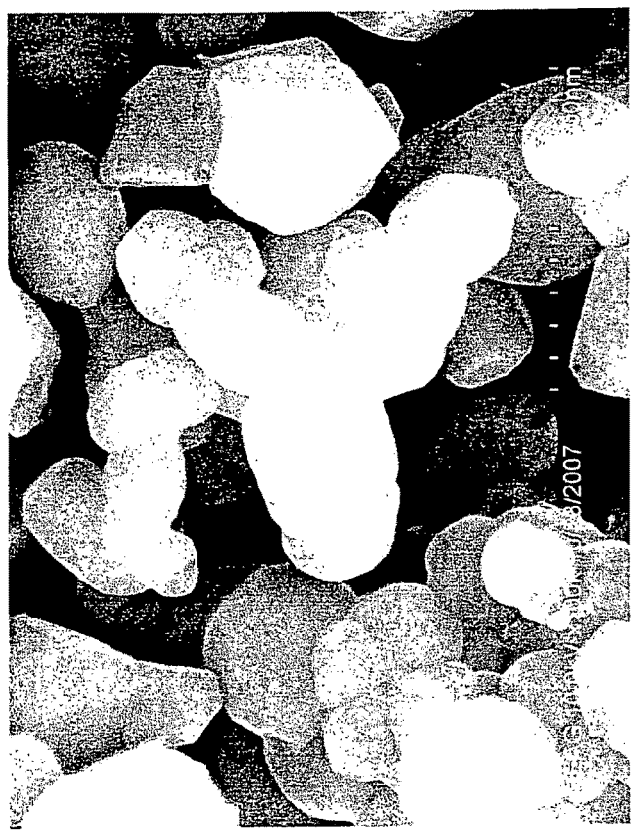
FIG. 1 shows scanning electron microscopic images of $0.1Li_2MnO_3 - 0.9LiMn_{0.26}Ni_{0.37}Co_{0.37}O_2$ material prepared according to either the sol-gel method or the co-precipitation method.
Figure 1:
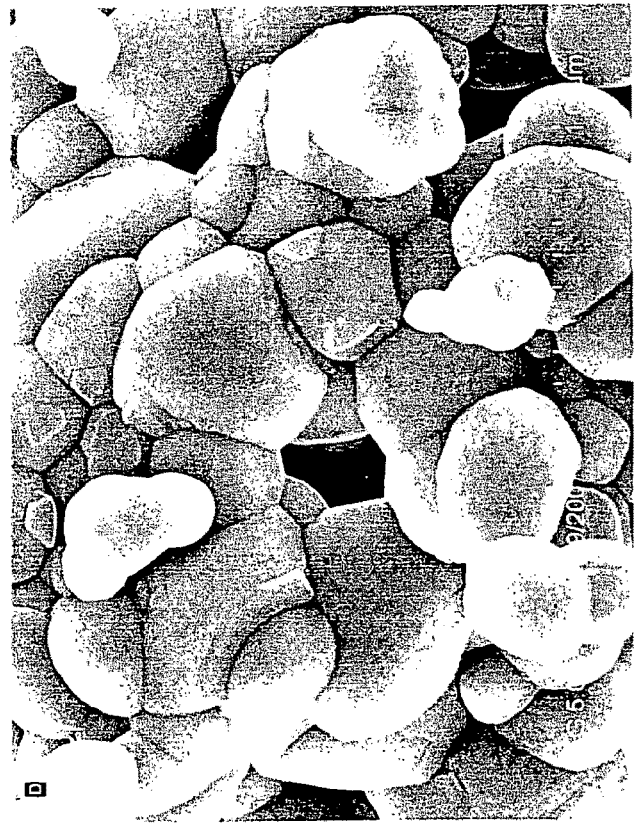

Prior to the present invention, a positive electrode material was described having the general formula $xLi_2MO_3.(1-x)LiM'O_2$ where M' is one or more trivalent ion with at least one ion being Mn or Ni and where M is a tetravalent ion. See, for example, U.S. Pat. Nos. 6,677,082 and 6,680,143, as well as Thackeray et al. (J. Mater. Chem., 15:2257-2267, 2005), the contents of which are hereby incorporated by reference. This positive electrode material has a composite structure in which, for example, a layered $Li_2MnO_3$ component is structurally integrated with a layered $LiM'O_2$ component. The present invention describes improvements in this composite positive electrode material and its use in batteries. More particularly, the present invention involves improvements in the morphology of the $xLi_2MO_3.(1-x)LiM'O_2$ composite positive electrode material.

In one aspect of the present invention, the positive electrode comprises a material having the composition $xLi_2MO_3.(1-x)LiM'O_2$ in which $0<x<1$ and where M' is one or more ion with an average oxidation state of three and with at least one ion being Mn or Ni, and where M is one or more ions with an average oxidation state of four. In addition to Mn and Ni, M' may include Co, Ti, V or Fe, or any other appropriate ion with an average oxidation state of three. M may include Mn, Ti, Zr, Ru, Re, Ir or Pt, or any other appropriate ion with an average oxidation state of four. M' may include one, two, three or more ions with an average oxidation state of three. A preferred material is one in which M comprises Mn, Ni and Co. M may include one two, three or more ions with an average oxidation state of four. A preferred material is one in which M comprises Mn.

Also prior to the present invention, a positive electrode material was described having the general formula $xLi_2MnO_3.(1-x)LiMn_{2-y}M_yO_4$ where $0.5<x<1.0$, $0 \le y<1$, and M is one or more metal cations. See, for example, U.S. Patent Application Publication Nos. 2006/0051671 and 2006/0051673, as well as Thackeray et al. (J. Mater. Chem., 15:2257-2267, 2005), the contents of which are hereby incorporated by reference. This positive electrode material has a composite structure in which a layered $Li_2MnO_3$ component is structurally integrated with a spinel $LiMn_{2-y}M_yO_4$ component. The present invention describes improvements in this composite positive electrode material and its use in batteries. More particularly, the present invention involves improvements in the morphology of the $xLi_2MnO_3.(1-x)LiMn_{2-y}M_yO_4$ composite positive electrode material.

In another aspect of the present invention, the positive electrode comprises a material having the composition $xLi_2MnO_3.(1-x)LiMn_{2-y}M_yO_4$ in which $0.5<x<1.0$, $0 \le y<1$, and where M is one or more metal cations with an average oxidation state ranging from one to four. The $Li_2MnO_3$ component has a layered structure and the $LiMn_{2-y}M_yO_4$ component has a spinel structure. In general, the $LiMn_{2-y}M_yO_4$ component constitutes less than 50 mole % of the electrode, preferably less than 20 mole %, and more preferably less than less than 10 mole %. M may include one or more monovalent, divalent, trivalent or tetravalent metal cations. Preferable cations include $Li^+$, $Mg^{2+}$, $Ni^{2+}$, $Ni^{3+}$, $Co^{2+}$, $Co^{3+}$, $Al^{3+}$, $Ti^{4+}$ and $Zr^{4+}$ ions. A preferred material is one in which y=0 and, therefore, M is absent.

In one aspect of the present invention, a positive electrode $xLi_2MO_3.(1-x)LiM'O_2$ material is made into a nano-crystalline composite structure. The nano-crystalline layered-layered composite structure has a particle size of less than 1 micron, preferably a particle size ranging from about 10 nm to about 500 nm, more preferably a particle size ranging from about 20 nm to about 500 nm, more preferably a particle size ranging from about 30 nm to about 500 nm, more preferably a particle size ranging from about 10 nm to about 200 nm, more preferably a particle size ranging from about 20 nm to about 200 nm, more preferably a particle size ranging from about 30 nm to about 200 nm.

In another aspect of the present invention, a positive electrode $xLi_2MnO_3.(1-x)LiMn_{2-y}M_yO_4$ material is made into a nano-crystalline composite structure. The nano-crystalline layered-spinel composite structure has a particle size of less than 1 micron, preferably a particle size ranging from about 10 nm to about 500 nm, more preferably a particle size ranging from about 20 nm to about 500 nm, more preferably a particle size ranging from about 30 nm to about 500 nm, more preferably a particle size ranging from about 10 nm to about 200 nm, more preferably a particle size ranging from about 20 nm to about 200 nm, more preferably a particle size ranging from about 30 nm to about 200 nm.

Exemplary methods for synthesizing a nano-crystalline composite structure of $xLi_2MO_3.(1-x)LiM'O_2$ material or a nano-crystalline composite structure of the $xLi_2MnO_3.(1-x)LiMn_{2-y}M_yO_4$ material include the use of synthesis by co-precipitation, or the use of sol-gel synthesis. However, any appropriate method for making nano-crystalline composite structures may be used, including plasma synthesis or pyrolysis methods, such as flame pyrolysis or laser pyrolysis.

By preparing a nano-crystalline composite structure of $xLi_2MO_3.(1-x)LiM'O_2$ material, or a nano-crystalline composite structure of the $xLi_2MnO_3.(1-x)LiMn_{2-y}M_yO_4$ material, a battery with an improved discharge system can be made.

In another aspect of the present invention, a nano-coating of inert oxide, inert phosphate or inert fluoride, or combinations thereof, is applied onto the nano-crystalline layered-layered composite structure of the $xLi_2MO_3.(1-x)LiM'O_2$ material, or the nano-crystalline layered-spinel composite structure of the $xLi_2MnO_3.(1-x)LiMn_{2-y}M_yO_4$ material. Any appropriate inert oxide, inert phosphate or inert fluoride may be used. Exemplary inert oxides include $TiO_2$, $ZrO_2$ or $Al_2O_3$. An exemplary inert phosphate includes $AlPO_4$, and an exemplary inert fluoride includes $AlF_3$. The nano-coating has a thickness of 20 nm or less, preferably 10 nm or less, or 5 nm or less, or 2 nm or less.

An exemplary method for nano-coating an inert oxide, inert phosphate or inert fluoride onto a nano-crystalline composite structure of $xLi_2MO_3.(1-x)LiM'O_2$ material or a nano-crystalline composite structure of the $xLi_2MnO_3.(1-x)LiMn_{2-y}M_yO_4$ material includes precipitation of an inert oxide, inert phosphate or inert fluoride from solution. For example, an aqueous solution of aluminum nitrate, titanium nitrate (e.g., by dissolving $TiO_2$ in nitric acid) or zirconyl nitrate is prepared, such as at a concentration ranging from 0.2 to 1 M. A solution containing any appropriate counterion to the metal cation may be used instead of nitrate, such as a chloride or alkoxide counterion. The nano-crystalline composite structure of $xLi_2MO_3.(1-x)LiM'O_2$ material or nano-crystalline composite structure of the $xLi_2MnO_3.(1-x)LiMn_{2-y}M_yO_4$ material is then dispersed in the nitrate solution. Ammonium hydroxide is added to the solution to precipitate hydrated inert oxide on the surface of the composite cathode particles. The resulting material is filtered and calcined to form a nano layer of inert oxide on the surface of the composite cathode particles. Calcination is at an appropriate time and temperature, such as at 400 to 600° C. for 4 to 8 hours.

Alternatively, a nano-coating of inert oxide, inert phosphate or inert fluoride may be precipitated from a non-aqueous solution onto a nano-crystalline composite structure. For example, the nano-crystalline composite structure is contacted with an acetone solution of titanium tetrachloride, resulting in adsorption of $TiCl_4$ on the surface of the particles of the nano-crystalline composite structure. Water is then added resulting in formation of titanium oxide on the surface of the particles, followed by calcination so as to form a nano layer of titanium oxide on the surface of the composite cathode particles.

By applying a nano-coating onto the nano-crystalline layered-layered composite structure of the $xLi_2MO_3\cdot(1-x)LiM'O_2$ material, or the nano-crystalline layered-spinel composite structure of the $xLi_2MnO_3\cdot(1-x)LiMn_{2-y}M_yO_4$ material, a battery with a further improved discharge system can be produced.

One objective of the present invention is to provide a lithium ion secondary battery with a high rate and high power capability, and with an energy density higher than conventional lithium ion batteries. In addition, the positive electrode materials of the present invention can be used to prepare lithium ion secondary batteries for applications in which the power density can be maintained with cycle life.

For example, the positive electrode materials of the present invention are useful in batteries used in devices which require a high power output, such as power tools, electric vehicles and hybrid electric vehicles. Generally, a cycle life of 300 is desired for power tools, and a cycle life of 1000 at 80% DOD (depth of discharge) is desired for electric vehicles and hybrid electric vehicles.

For example, when positive electrode materials of the present invention are formulated in a 26650 cell, a cycle life greater than 900 can be achieved and a continuous power density of 2500 W/kg. As another example, when positive electrode materials of the present invention are formulated in a 18650 cell, a cycle life greater than 900 can be achieved and a continuous power density of 1800 W/kg.

In making a positive electrode of the present invention, the positive electrode material is typically coated on a current collector. Any current collector appropriate for use in a lithium battery can be used. Exemplary materials for current collectors include aluminum, copper, nickel and titanium. In addition, any anode and any electrolyte appropriate for use in a lithium battery can be used. An exemplary anode material is graphite. An exemplary electrolyte is a mixture of ethylene carbonate and ethyl methyl carbonate containing 1M of lithium hexa-fluorophosphate ($LiPF_6$).

Example 1

Synthesis of Nanocrystalline Positive Electrode Material

Commercially available positive electrode material typically has a particle size of 1 micron and above. The following examples describe synthesis of positive electrode material having a nano-composite structure. The positive electrode material has the general formula: $0.1Li_2MnO_3\text{-}0.9LiMn_{0.26}Ni_{0.37}Co_{0.37}O_2$. The conditions of the synthesis process can be adjusted so as to control the particle size. The particle size obtained is below 1 micron, preferably between 20 nm and 500 nm.

Synthesis by Co-Precipitation

Stoichiometric amounts of manganese acetate, nickel acetate and cobalt acetate are dissolved in deionized water. The concentration of the solution ranges from 0.01 M to 0.5 M. Then 0.1 M LiOH solution is added drop-wise to form the co-precipitated hydroxides of manganese, nickel and cobalt. The resultant slurry is filtered, washed several times and dried in an oven at 100° C. for 6 to 10 hours. The resulting material is mixed and ground with stoichiometric amount of LiOH using a mortar and pestle. Subsequently, the mixture is reacted in a furnace to provide the composite structure. Typical reaction conditions are 200 to 800° C. for 4 to 20 hours.

Particle size of the co-precipitated hydroxide is obtained in the nano range by controlling the concentration of the solution. In general, dilute solution results in precipitates of finer particle sizes in the nano range. Care also must be taken in optimizing reaction time and temperature as higher temperature and longer time will result in coarse micron size particles. FIG. 1 shows a scanning electron microscopic image of $0.1Li_2MnO_3\text{-}0.9LiMn_{0.26}Ni_{0.37}Co_{0.37}O_2$ material prepared according to the co-precipitation method.

Sol-Gel Synthesis

Stoichiometric amount of lithium acetate, manganese acetate, nickel acetate and cobalt acetate are dissolved in distilled water. The concentration of the solution ranges from 0.01 M to 0.5 M. A chelating agent such as glycolic acid is used in the sol gel synthesis process. Other chelating agents such as citric acid may also be used. The dissolved solution is added drop-wise to a continuously stirred aqueous solution of glycolic acid. The pH of the solution is adjusted to from 7.0 to 7.5 using ammonium hydroxide solution. The prepared solution is heated at 60 to 90° C. for 4 to 20 hours to obtain sol and gel. The resulting precursor is decomposed in a furnace at 400 to 600° C. for 4 to 16 hours in air. Subsequently, it is ground and calcined in a furnace. The calcination temperature is from 600 to 1000° C. and the calcination time ranges from 4 to 20 hours. Highly crystalline nano-structured composite cathode material is obtained after the calcination process. FIG. 1 shows a scanning electron microscopic image of $0.1Li_2MnO_3\text{-}0.9LiMn_{0.26}Ni_{0.37}CO_{0.37}O_2$ material prepared according to the sol-gel method.

Example 2

Nano Coating on Positive Electrode Particles

A process is provided to coat the composite cathode particles with an inert oxide having a thickness of a few nanometers. The synthesized composite cathode particles are dispersed in an aqueous aluminum nitrate solution having a concentration of 0.2 M to 1M. Ammonium hydroxide is added drop-wise to the solution resulting in precipitation of hydrated aluminum oxide on the surface of the composite cathode particles. The resulting material is filtered and then calcined in a furnace at 400 to 600° C. for 4 to 8 hours. This results in a nano layer of $Al_2O_3$ on the surface of the composite cathode particles. A nano layer of inert oxides such as $TiO_2$ and $ZrO_2$ may also be coated on the surface.

Example 3

Evaluation of Electrochemical Properties

Coin cells are fabricated to evaluate the electrochemical performance. Nano-crystalline composite oxide having a composition of $0.1Li_2MnO_3$-$0.9LiMn_{0.28}Ni_{0.37}Co_{0.37}O_2$ is used as a positive electrode material. Graphite is used as the negative electrode material. The electrolyte is a mixture of ethylene carbonate and ethyl methyl carbonate containing 1M of lithium hexa-fluorophosphate ($LiPF_6$).

Figure 2:
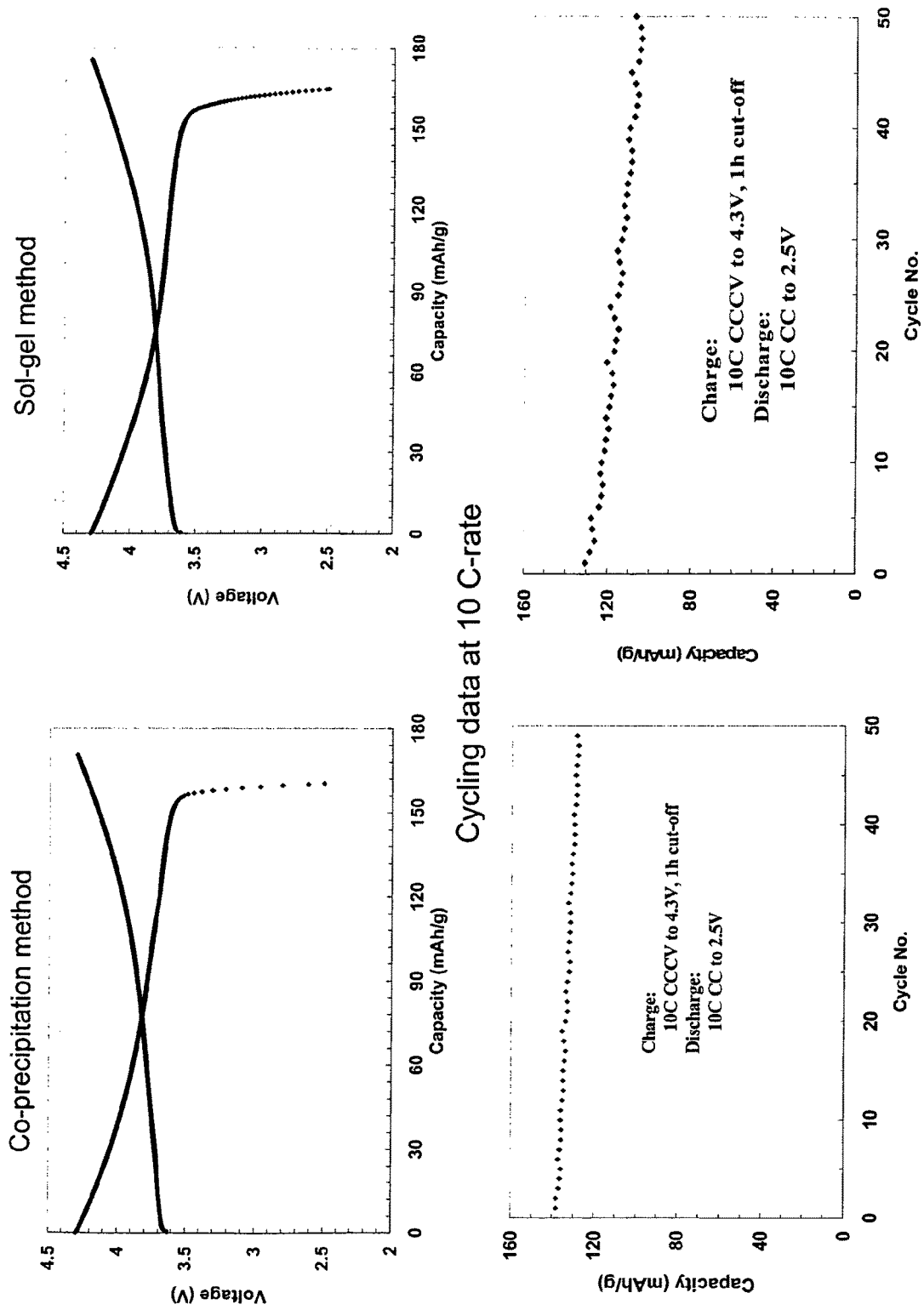
FIG. 2 shows charge and discharge curves of $0.1Li_2MnO_3$-$0.9LiMn_{0.26}Ni_{0.37}Co_{0.37}O_2$ material prepared according to either the sol-gel method or the co-precipitation method.

The positive electrode is fabricated by first preparing a slurry of nano-crystalline composite oxide, PVDF binder, conductive carbon and n-methyl pyrrolidinone (NMP). The slurry is coated on an aluminum foil, vacuum dried and then punched to form the positive electrode. Similarly, the negative electrode is prepared from a slurry of graphite, PVDF binder, conductive carbon and NMP. The slurry is coated on copper foil, vacuum dried and punched to form the negative electrode. A polypropylene separator is placed between the positive and negative electrodes. Subsequently, the electrodes are placed inside coin cells filled with electrolyte and crimped. FIG. 2 shows charge and discharge curves of $0.1Li_2MnO_3$-$0.9LiMn_{0.26}Ni_{0.37}Co_{0.37}O_2$ material prepared according to either the sol-gel method or the co-precipitation method.

Batteries fabricated with nano-crystalline composite oxide exhibit excellent rate capability as desired for high power applications. The batteries fabricated with coated positive electrode particles show lower irreversible capacity loss and higher discharge capacity after particle modification. They also exhibit better high temperature performance, better cycling stability and long calendar life.

All references cited in this disclosure are incorporated by reference to the same extent as if each reference had been incorporated by reference in its entirety individually.

While the invention has been described in detail and with reference to specific embodiments thereof, it will be apparent to one skilled in the art that various variations and modifications can be made therein without departing from the sprit and scope thereof. All such variations and modifications are intended to be included within the scope of this disclosure and the present invention and protected by the following claims.

We claim:

1. A positive electrode for a lithium ion battery, the positive electrode comprises:
    a nano-crystalline layered-layered composite structure having a general formula $xLi_2MO_3.(1-x)LiM'O_2$, wherein the nano-crystalline layered-layered composite structure comprises a layered $Li_2MO_3$ component and a layered $LiM'O_2$ component structurally integrated with each other wherein $0<x<1$,
    M' comprises three or more ions with an average oxidation state of three and with at least three of the ions being Mn, Ni and Co or Ni, and
    M comprises one or more ions with an average oxidation state of four; and
    a nano-coating disposed on surfaces of the nano-crystalline layered-layered composite structure, wherein the nano-coating comprises an inert phosphate, inert fluoride or a combination thereof.

2. The positive electrode of claim 1, wherein M comprises Mn.

3. The positive electrode of claim 1, wherein the nano-crystalline layered-layered composite structure comprises a particle size of less than 1 micron.

4. The positive electrode of claim 3, wherein the nano-crystalline layered-layered composite structure comprises a particle size ranging from about 10 nm to about 500 nm.

5. The positive electrode of claim 1, wherein the inert phosphate comprises $AlPO_4$.

6. The positive electrode of claim 1, wherein the inert fluoride comprises $AlF_3$.

7. The positive electrode of claim 1, wherein the nano-coating comprises a thickness of 20 nm or less.

8. The positive electrode of claim 1, is part of the lithium ion battery comprising a negative electrode and an electrolyte.

9. A method for making a positive electrode for a lithium ion battery comprising:
    providing a nano-crystalline layered-layered composite structure having a general formula $xLi_2MO_3.(1-x)LiM'O_2$, wherein the nano-crystalline layered-layered composite structure comprises a layered $Li_2MO_3$ component and a layered $LiM'O_2$ component structurally integrated with each other, wherein $0<x<1$,
    M' comprises three or more ions with an average oxidation state of three and with at least three of the ions being Mn, Ni and Co, and
    M comprises one or more ions with an average oxidation state of four;
    forming a nano-coating on the nano-crystalline composite structure, the nano-coating comprises inert phosphate, inert fluoride or a combination thereof.

10. The method of claim 9, wherein providing the nano-crystalline layered-layered composite structure comprises forming the nano-crystalline layered-layered composite structure by co-precipitation.

11. The method of claim 9 wherein providing the nano-crystalline layered-layered composite structure comprises forming the nano-crystalline layered-layered composite structure by sol-gel synthesis.

12. The method of claim 9 wherein forming a nano-coating comprises:
    applying an ammonium hydroxide precipitation from an aqueous solution; and
    forming the nano-coating on the nano-crystalline layered-layered composite structure by calcination.

13. The method of claim 12 wherein the ammonium hydroxide precipitation from the aqueous solution comprises inert phosphate and/or inert fluoride.

* * * * *